(12) United States Patent
Lowe et al.

(10) Patent No.: US 11,827,549 B1
(45) Date of Patent: Nov. 28, 2023

(54) WASTEWATER TREATMENT AND DISPOSAL SYSTEM

(71) Applicants: David Mark Lowe, Lake Stevens, WA (US); Richard D. Eldredge, Lake Stevens, WA (US)

(72) Inventors: David Mark Lowe, Lake Stevens, WA (US); Richard D. Eldredge, Lake Stevens, WA (US)

(*) Notice: Subject to any disclaimer, the term of this patent is extended or adjusted under 35 U.S.C. 154(b) by 0 days.

(21) Appl. No.: 17/669,374

(22) Filed: Feb. 11, 2022

Related U.S. Application Data

(60) Provisional application No. 63/215,440, filed on Jun. 26, 2021.

(51) Int. Cl.
*C02F 3/06* (2023.01)
*C02F 3/12* (2023.01)

(52) U.S. Cl.
CPC .............. *C02F 3/06* (2013.01); *C02F 3/1242* (2013.01); *C02F 2203/002* (2013.01)

(58) Field of Classification Search
CPC ..... C02F 3/06; C02F 3/1242; C02F 2203/002
USPC .......................................................... 210/201
See application file for complete search history.

(56) References Cited

U.S. PATENT DOCUMENTS

| | | | | |
|---|---|---|---|---|
| 3,202,285 | A * | 8/1965 | Williams | C02F 3/30 210/221.1 |
| 3,438,499 | A * | 4/1969 | Reckers | C02F 3/121 210/220 |
| 3,627,135 | A * | 12/1971 | Goodman | C02F 3/1242 210/221.1 |
| 3,677,409 | A * | 7/1972 | Ferm | B01D 21/10 210/195.3 |
| 5,531,894 | A * | 7/1996 | Ball | C02F 3/302 210/615 |
| 5,766,475 | A * | 6/1998 | Mayer | C02F 3/046 210/150 |
| 10,308,536 | B1 * | 6/2019 | Lowe | C02F 1/72 |

* cited by examiner

*Primary Examiner* — Ekandra S. Miller-Cruz
(74) *Attorney, Agent, or Firm* — Joseph Z. Ellawork

(57) ABSTRACT

A wastewater treatment system is a septic tank adjacent to an aeration chamber. The aeration chamber has a tertiary baffle and a circular current of fluid wherein the circular current produces a down flow current of liquid past the tertiary baffle. This current prevents suspended particles from passing through the tertiary baffle.

19 Claims, 2 Drawing Sheets

WASTEWATER TREATMENT AND DISPOSAL SYSTEM

This application claims the benefit of U.S. Provisional Patent Application No. 63/215,440, filed Jun. 26, 2021, which is incorporated by reference herein in its entirety.

FIELD OF THE INVENTION

A wastewater treatment and disposal system, specifically for effluent treatment in residential or commercial properties.

BACKGROUND

A sewage treatment system separates solid waste from liquid waste and treats the liquid waste so it can be disposed of safely. In a residential septic system the liquid waste (effluent) may be disposed of in a drain field. Solid waste in the effluent makes treatment more difficult and can clog the drain field during dispersal. Ineffective treatment of the effluent may cause harm to the environment and ground water. A clogged drain field may require expensive removal and replacement of the septic system.

SUMMARY

In view of the foregoing, a system for the treatment of sewage is described herein which provides for an efficient and multifunctional sewage treatment process by simple means, while avoiding the aforementioned disadvantages.

A wastewater treatment system having a septic tank and an aeration chamber with a first and second side and a tertiary baffle proximate to the second side. Within the aeration chamber a circular current of fluid produces a down flow current of liquid on the second side of the aeration chamber and prevents suspended particles from passing through the tertiary baffle.

A septic tank with an aeration chamber having a first side and tertiary baffle proximate a second side. A circular current of fluid in the aeration chamber produces a down flow current of liquid on the second side and prevents suspended particles from passing through the tertiary baffle.

A method of waste water treatment comprising providing a septic tank having an aeration chamber and circulating a liquid to produce a down flow current on a second side. The down flow current preventing suspended particles from passing through a tertiary baffle.

DETAILED DESCRIPTION

Figure 1:
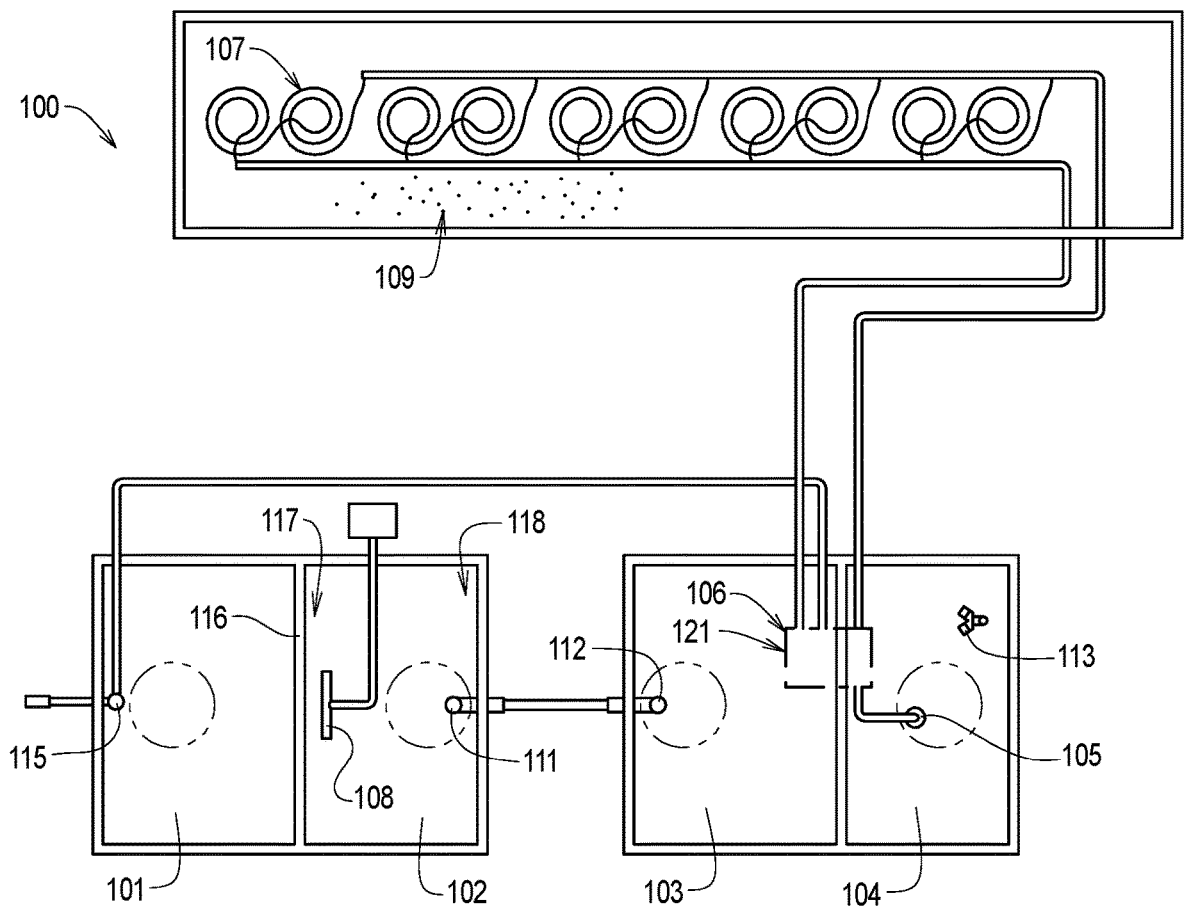
FIG. 1: Plan view of the wastewater treatment and disposal system.
Figure 2:
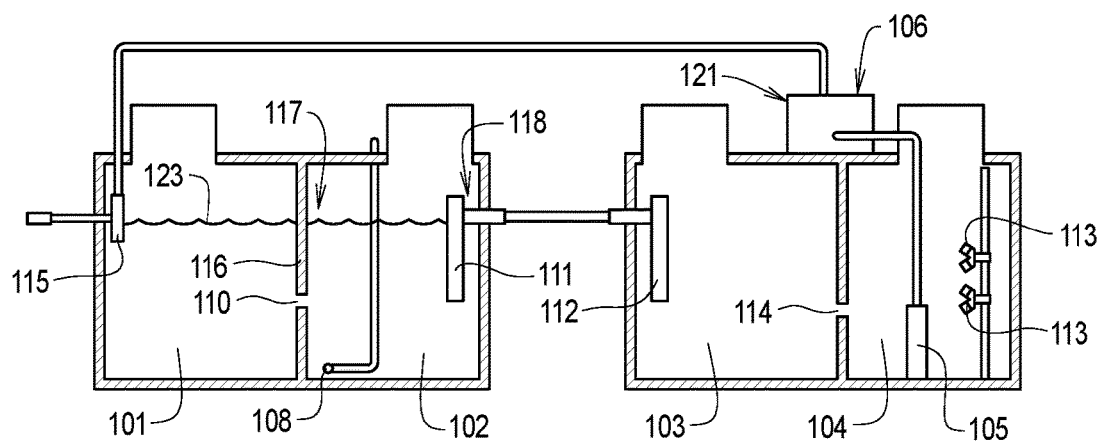
FIG. 2: Side view taken from the wastewater treatment and disposal system of FIG. 1.
Figure 3:
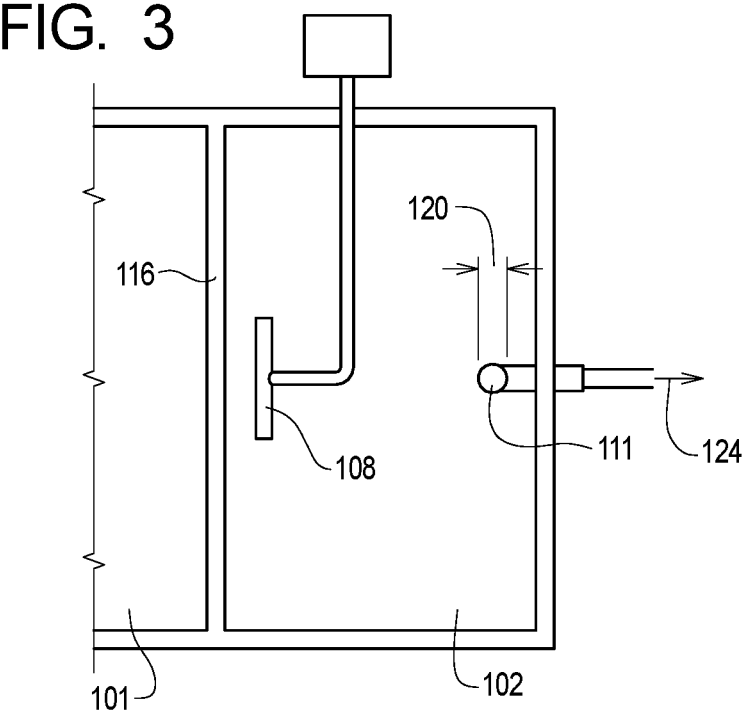
FIG. 3: Plan view of a septic tank.
Figure 4:
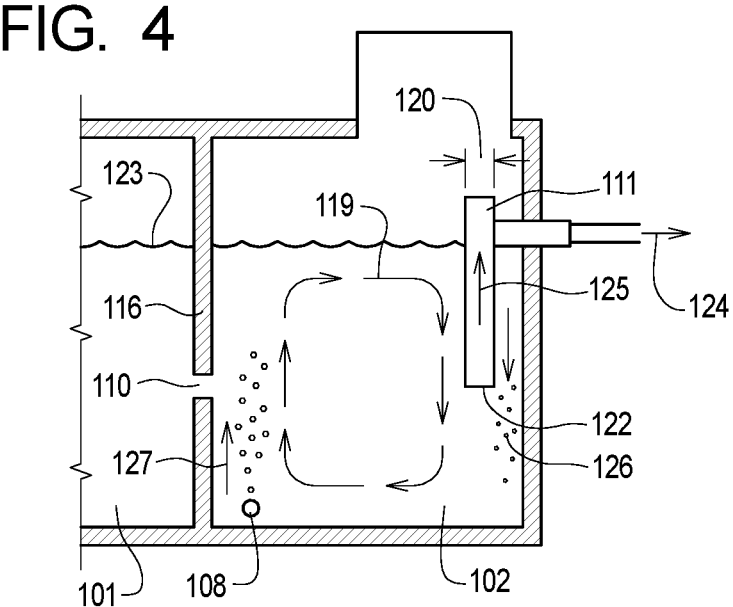
FIG. 4: Side view taken from the septic tank in FIG. 3.

Described herein is a wastewater treatment and disposal system that has six processes: primary setting and treatment, aeration (nitrification), clarification, recirculation (de-nitrification), filtration (disinfection), and dispersion. To facilitate these processes the physical plant has ten major components: septic tank 101, aeration chamber 102 with diffuser 108, clarifier 103, discharge tank 104 with submersible pump 105, reverse flush headworks 106, drip irrigation coils 107, and sand media 109.

Raw sewage from a home or similar waste stream enters the septic tank 101 through the inlet baffle 115. Organic content in the waste stream is reduced by 60-70% in the septic tank. Over time a layer of scum forms on the surface of the septic tank contents at the same time a layer of sludge accumulates on the floor of the tank. A clarified zone of septic tank effluent develops between the scum and sludge layers. Through positive displacement, septic tank effluent is forced though the septic by-pass port 110 thereby entering the aeration chamber 102.

In the aeration chamber 102 air is pumped into the chamber near the bottom of the chamber through the structure of the diffuser 108. Air is released through the diffuser 108 creating an aggressive upward flow thereby initiating a kinetic energy pathway. This kinetic pathway starts a circular flow up along the patrician wall 116 then horizontally toward the opposite wall, then downward along the tertiary baffle 111 to the bottom of the tank, and then returning to the diffuser 108 to start the circuit again. The downward flow path past the bottom of the tertiary baffle 111 precludes organic partials from flowing up the tertiary baffle 111, reducing solids from passing into the clarifier 103. The liquid inside the tertiary baffle 111 is stationary except for the upward flow caused by positive displacement of incoming wastewater. The kinetic flow path in the aeration chamber 102 is in the opposite direction of the positive displacement flow path of the tertiary baffle 111. The velocity of the particles flowing downward past the bottom of the tertiary baffle 111 is greater than the upward positive displacement flow inside the tertiary baffle 111. Because the flow inside the interior of the tertiary baffle 111 has a very low velocity, particles in suspension that have a higher specific gravity than water will precipitate out back into the aeration 102 chamber. Adding additional air into the liquid mass in the aeration chamber is necessary to enhance the biological activity in the process. The mixing is a secondary effect of aeration. By aerating/mixing the liquid we ensure a homogeneous treatment level. The next step of the process (after the tertiary baffle) is the clarifier. This addition of air creates an aerobic environment and increases the aerobic biological process of consuming the soluble organic particulate, creating secondary treated effluent and also converting ammonium to nitrate (nitrification).

Clarified liquid now passes into the clarifier 103 through the long baffle 112 forcing any remaining organic particles downward where they would settle to the bottom of the clarifier 103. As water enters the clarifier103 water also flows into the discharge tank 104 through positive displacement.

The organic concentration of the liquid contents of the discharge tank 104 has been reduced by 90 to 98 percent, fecal coliform bacteria concentrations have been reduced by three or four log base 10 (1,000-10,000 times), and virtually all of the nitrogen compounds have been converted to nitrate or bound up in protein chains. The discharge tank 104 is equipped with a discharge/recirc pump 105 and two normally open float switches 113. When the bottom float switch has inverted it sends a signal to a control panel and starts a repeat cycle timer. The control panel will start the cycles with the off time. Once the off time is ended the pump on time is initiated. During the on time the control panel will energize the pump and two normally closed solenoid valves in the reverse flush headworks 106. This cycle will cause liquid to flow through a disc filter and a flow meter and deliver effluent to a plurality of drip irrigation coils 107.

Effluent is dosed in small, discrete doses to the sand media 109. The sand media 109 has been placed on the soil surface and acts as the final dispersal component of the system. As the effluent passes through the sand media 109 further reduction in any remaining organic matter, total nitrogen levels, and fecal coliform and E. coli bacteria occurs.

After a number of on and off cycles, then the drip irrigation coils 107 and the disc filter in the reverse flush headworks 106 will be back flushed to clean them. This is accomplished by the control panel energizing the discharge/recirc pump 105 and two normally closed solenoid valves in the reverse flush headworks 106 causing a reverse flow of effluent to remove any debris trapped in the filter. The flush liquid is vented back into the inlet baffle 115 of the septic tank 101. When the reverse flush cycle is complete a forward flush cycle is activated. The control panel energizes the discharge/recirc pump 105 the two dosing valves plus third flush valve in the reverse flush headworks 106. This causes the drip irrigation coils 107 to be flushed, removing any debris that may have accumulated in the drip tubing. The flush liquid is delivered back to the inlet baffle 115 of the septic tank 101. The flush liquid also helps to prevent any clogging of solids in the inlet baffle 115.

At the end of the coil flush cycle the control panel reverts back to the dose cycles and the process is repeated until the bottom float switch 113 drops. During the two flush cycles nitrified effluent from the discharge/recirc tank 104 is introduced into the septic tank 101. The contents of the septic tank 101 are facultative to anaerobic with a high carbon content. These conditions will de-nitrify the nitrate in the flush liquid. By manipulating the frequency and the duration of the flush cycles the system can be manipulated to achieve a significant de-nitrification level. When the bottom float switch 113 drops the on and off pump cycles stop.

Denitrification is the microbial process of reducing nitrate and nitrite to gaseous forms of nitrogen, principally nitrous oxide ($N_2O$) and nitrogen ($N_2$). A large range of microorganims can denitrify. Denitrification is a response to changes in the oxygen ($O_2$) concentration of their immediate environment.

The septic tank 101 adjacent to an aeration chamber 102 have substantially the same water level 123 due to the septic bypass port 110 in the partition wall 116. The septic bypass port 110 is placed in the partition wall 116 above the solids on the bottom of the septic tank and below the scum floating on top 123. Therefore, the clearest water in the septic tank 101 is flowing into the aeration chamber 102.

For example: In a typical aeration chamber 102 it takes about two minutes for solids particles or debris to settle out of solution to the bottom of the tank. The average flow through the septic tank 101 is about one gallon per minute. If the tertiary baffle 111 had a diameter of 6" and was 2' long, there would be 0.39 cu. ft. or 2.93 gallons within the tertiary baffle 111. At one gallon per minute, it would take 2.93 minutes for liquid to travel from the bottom of the baffle to the top and reach the clarifier. This slow flow rate means that during the same time the liquid was rising in the tertiary baffle 111 all of the suspended solids would have time to settle out.

A further embodiment of the invention is a waste water treatment system 100 having an aeration chamber 102 having a first side 117 and second side 118. A tertiary baffle 111 is proximate to the second side 118. A circular current of fluid 119 produces a down flow current of liquid on the aeration chamber second side 118, and prevents suspended particles 126 from passing through the tertiary baffle 111. The circular current 119 causes suspended particles 126 to move past an inlet of the tertiary baffle 111 at a rate greater than the flow into the inlet of the tertiary baffle 111. Further, the tertiary baffle 111 may have an internal diameter 120 configured to produce an upward flow rate of substantially solid free fluid 125 that is low relative to the downward flow in the circular current 119. The substantially solid free fluid 125 travels up the tertiary baffle 111 and outflows into the clarifier 124. The fluid outflowing into the clarifier 124 has substantially no suspended particles 126. The aeration chamber 102 may further comprise an air diffuser configured to make bubbles 127 on the first side 117, wherein the upward movement of the bubbles 127 creates the circular current 119. The wastewater treatment system 100 may cause a clarified liquid (substantially free of solid particles) to pass through the tertiary baffle 111 substantially free of solid debris 126.

Further, an example embodiment of a wastewater treatment system 100 may comprise an inlet baffle 115 leading into a septic tank 101 and a disc filter, wherein liquid is back flushed from the disc filter 121 to the inlet baffle 115 and the liquid is denitrified in the septic tank 101. Liquid may also be forward flushed from the drip tubing coil 107 to the inlet baffle 115 of the septic tank 101, wherein the forward flushed liquid is denitrified in the septic tank 101. Also, liquid may be back flushed from the disc filter 121 to the inlet baffle 115 to prevent the inlet baffle 115 from clogging due to solid waste accumulation. Alternately, liquid may be forward flushed from the drip tubing coil 107 to the inlet baffle 115 of the septic tank 101 to prevent the inlet baffle 115 from clogging.

A septic tank 101 may comprise an aeration chamber 102 having a first 117 and a second side 118, a tertiary baffle 111 proximate to the second side 118 and a circular current of fluid 119, wherein the circular current produces a down flow current of liquid on the second side 118, and prevents suspended particles from passing through the tertiary baffle 111. The circular current 119 may cause suspended particles to move past an inlet of the tertiary baffle 122 at a rate greater than the flow of fluid into the inlet of the baffle 122. The tertiary baffle 111 may have an internal diameter 120 configured to produce an upward fluid flow rate that is low relative to the downward flow in the circular current 119. The septic tank 101 may further comprise an air diffuser 108 configured to make bubbles on the first side of the aeration chamber 117, wherein the upward movement of the bubbles creates the circular current 119. Further, the clarified liquid passes through the tertiary baffle 111 substantially free of solid debris.

A further embodiment is a method of waste water treatment comprising, providing a septic tank 101 having an aeration chamber 102 first 117 and second side 118, circulating a liquid to produce a circular current of fluid 119 and a down flow current on the second side 118, and preventing suspended particles from passing through the tertiary baffle 111. The method may further comprise, circulating liquid 119 comprising suspended particles past an inlet 122 of the tertiary baffle 111 at a rate greater than the flow into the inlet of the baffle 122. The method may further comprise providing a tertiary baffle 111 having an internal diameter 120 configured to produce an upward fluid flow rate that is low relative to the downward flow in the circulating liquid 119. Further, the method may comprise defusing air bubbles 108 into the liquid on the first side 117, wherein the upward movement of the bubbles circulates the liquid 119. Still further, the method may comprise passing a clarified liquid through the tertiary baffle 111 substantially free of solid debris. Also, the method may further comprise, forward flushing liquid through a drip tubing coil 107 to the inlet baffle 115 of the septic tank 101 and, denitrifying the liquid in the septic tank 101.

The invention claimed is:

1. A wastewater treatment system comprising: a septic tank configured to denitrify liquid; an aeration chamber downstream of the septic tank, wherein the aeration chamber comprises an aeration chamber first side proximate to a partition wall and an aeration chamber second side opposite the aeration chamber first side, a tertiary baffle proximate to the aeration chamber second side an air diffuser, and a circular current of fluid, wherein the air diffuser is configured to create the circular current of fluid by producing an upward flow along the partition wall, a horizontal flow toward the aeration chamber second side and, a down flow current of liquid on the aeration chamber second side past the tertiary baffle, a long baffle and a clarifier downstream from the aeration chamber, wherein the wastewater treatment system is configured to pass the liquid through the tertiary baffle, into the long baffle, and into the clarifier, wherein the long baffle is configured to force any remaining organic particles downward to settle on a bottom of the clarifier.

2. The wastewater treatment system of claim 1 wherein the air diffuser is configured to produce bubbles on the aeration chamber first side, and an upward movement of the bubbles creates the circular current of fluid.

3. The wastewater treatment system of claim 1 wherein, the circular current of fluid is configured to cause a clarified liquid to pass through the tertiary baffle free of solid debris.

4. The wastewater treatment system of claim 1 further comprising,
an inlet baffle in the septic tank, and
a disc filter,
wherein liquid is backflushed from the disc filter to the inlet baffle, wherein the backflushed liquid is denitrified in the septic tank.

5. The wastewater treatment system of claim 1 further comprising,
a drip tubing coil, and
an inlet baffle in the septic tank wherein,
liquid is forward flushed from the drip tubing coil to the inlet baffle in the septic tank, wherein
the forward flushed liquid is denitrified in the septic tank.

6. The wastewater treatment system of claim 1 further comprising,
an inlet baffle in the septic tank, and
a disc filter,
wherein, liquid is backflushed from the disc filter to the inlet baffle, wherein the backflushed liquid prevents the inlet baffle from clogging with solid waste.

7. The wastewater treatment system of claim 1 wherein, a drip tubing coil, and an inlet baffle in the septic tank wherein, liquid is forward flushed from the drip tubing coil to the inlet baffle of the septic tank, wherein the forward flushed liquid prevents the inlet baffle from clogging.

8. A septic tank system comprising: a septic tank, configured to denitrify liquid. divided from an aeration chamber by a partition wall, the aeration chamber having an aeration chamber first side proximate the partition wall and an aeration chamber second side opposite the aeration chamber first side, a tertiary baffle proximate to the aeration chamber second side a diffuser proximate to the aeration chamber first side and a circular current of fluid, wherein the diffuser is configured to create the circular current of fluid by producing an upward flow along the partition wall, a horizontal flow toward the aeration chamber second side and, a down flow current of liquid on the aeration chamber second side past the tertiary baffle, a long baffle and a clarifier downstream from the aeration chamber, wherein the wastewater treatment system is configured to pass the liquid through the tertiary baffle, into the long baffle, and into the clarifier, wherein the long baffle is configured to force any remaining organic particles downward to settle on a bottom of the clarifier.

9. The septic tank system of claim 8 further comprising, an air diffuser configured to produce bubbles on the aeration chamber first side, wherein an upward movement of the bubbles creates the circular current of fluid.

10. The septic tank system of claim 8 wherein, the circular current of fluid is configured to alloy a clarified liquid to pass through the tertiary baffle free of solid debris.

11. A method of waste water treatment comprising the steps of: providing a septic tank, denitrifying a liquid in the septic tank, treating the liquid in an aeration chamber, wherein the aeration chamber comprises an aeration chamber first side proximate to a partition wall and an aeration chamber second side, providing an air diffuser to circulate the liquid to produce an upward flow along the partition wall, a horizontal flow toward the aeration chamber second side and, a down flow current on the second side and, preventing suspended particles from passing through a tertiary baffle, providing a long baffle and a clarifier downstream from the aeration chamber, wherein the liquid in the wastewater treatment system passes through the tertiary baffle, into the long baffle, and into the clarifier, and wherein the long baffle forces any remaining organic particles downward to settle on a bottom of the clarifier.

12. The method of claim 11, wherein the air diffuser diffuses air bubbles into the liquid on the aeration chamber first side, and an upward movement of the air bubbles circulates the liquid.

13. The method of claim 11 further comprising, passing a clarified liquid through the tertiary baffle free of solid debris.

14. The method of claim 11 further comprising, forward flushing liquid through a drip tubing coil to an inlet baffle in the septic tank and, denitrifying the forward flushed liquid in the septic tank.

15. The wastewater treatment system of claim 1 further comprising,
a septic bypass port in the partition wall.

16. The wastewater treatment system of claim 1 further comprising,
a discharge tank,
wherein, organic compounds in the water flowing into the discharge tank have been reduced by 90-98% compared to water entering the septic tank.

17. The wastewater treatment system of claim 1 further comprising the tertiary baffle having a diameter of 6 inches and a length of 2 feet.

18. The septic tank system of claim 8 further comprising, a septic bypass port in the partition wall.

19. The septic tank system of claim 8 further comprising the tertiary baffle having a diameter of 6 inches and a length of 2 feet.

* * * * *